United States Patent
Takahashi (10) Patent No.: US 8,635,386 B2
(45) Date of Patent: Jan. 21, 2014

(54) COMMUNICATION CONTROL DEVICE, DATA COMMUNICATION METHOD AND PROGRAM

(75) Inventor: Fumio Takahashi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 143 days.

(21) Appl. No.: 13/105,427

(22) Filed: May 11, 2011

(65) Prior Publication Data

US 2011/0289243 A1 Nov. 24, 2011

(30) Foreign Application Priority Data

May 21, 2010 (JP) ................................ 2010-117160

(51) Int. Cl.
*G06F 13/00* (2006.01)
*G06F 7/02* (2006.01)

(52) U.S. Cl.
USPC ............................................. 710/35; 710/53

(58) Field of Classification Search
USPC .......................................................... 710/35
See application file for complete search history.

(56) References Cited

U.S. PATENT DOCUMENTS

| | | | | |
|---|---|---|---|---|
| 5,958,027 | A * | 9/1999 | Gulick | 710/300 |
| 6,393,493 | B1 * | 5/2002 | Madden et al. | 719/321 |
| 6,816,929 | B2 | 11/2004 | Ueda | |
| 7,028,109 | B2 * | 4/2006 | Saito et al. | 710/33 |
| 7,409,476 | B1 * | 8/2008 | Liang et al. | 710/52 |
| 7,526,594 | B2 * | 4/2009 | Tseng et al. | 710/310 |
| 2006/0195625 | A1 | 8/2006 | Hesse | |
| 2010/0217942 | A1 * | 8/2010 | Kondo | 711/154 |

FOREIGN PATENT DOCUMENTS

JP 2001-306482 A 2/2001
JP 2002-9849 (A) 1/2002

OTHER PUBLICATIONS

USB Implementers Forum, Inc, "Universal Serial Bus 3.0 Specification," Nov. 12, 2008, 482 pages.

* cited by examiner

*Primary Examiner* — Titus Wong
(74) *Attorney, Agent, or Firm* — Foley & Lardner LLP (57) ABSTRACT

A communication control device includes reception controllers capable of receiving data in a burst transfer mode in which packets are continuously transferred as one burst. There are dedicated buffers having a capacity of one packet for each of a plurality of endpoints and common buffers shared by the endpoints; a first packet of a burst transfer is stored in the dedicated buffer; and a common buffer is secured at the same time. The dedicated buffers and common buffers are controlled according to a transfer status.

13 Claims, 7 Drawing Sheets

|  | REGION NUMBER | ALLOCATION TARGET ENDPOINT | REGION SECURING ORDER |
|---|---|---|---|
| ENDPOINT COMMON BUFFER REGION 1 | 1 | | |
| ENDPOINT COMMON BUFFER REGION 2 | 2 | | |

FIG. 7

| | REGION NUMBER | ALLOCATION TARGET ENDPOINT | REGION SECURING ORDER |
|---|---|---|---|
| TABLE AT TIMING T1 | | | |
| ENDPOINT COMMON BUFFER REGION 1 | 1 | 0 | 0 |
| ENDPOINT COMMON BUFFER REGION 2 | 2 | 0 | 0 |
| TABLE AT TIMING T3 | | | |
| ENDPOINT COMMON BUFFER REGION 1 | 1 | 1 | 1 |
| ENDPOINT COMMON BUFFER REGION 2 | 2 | 0 | 0 |
| TABLE AT TIMING T9 | | | |
| ENDPOINT COMMON BUFFER REGION 1 | 1 | 1 | 1 |
| ENDPOINT COMMON BUFFER REGION 2 | 2 | 1 | 2 |
| TABLE AT TIMING T11 | | | |
| ENDPOINT COMMON BUFFER REGION 1 | 1 | 0 | 0 |
| ENDPOINT COMMON BUFFER REGION 2 | 2 | 1 | 1 |
| TABLE AT TIMING T12 | | | |
| ENDPOINT COMMON BUFFER REGION 1 | 1 | 0 | 0 |
| ENDPOINT COMMON BUFFER REGION 2 | 2 | 0 | 0 |

COMMUNICATION CONTROL DEVICE, DATA COMMUNICATION METHOD AND PROGRAM

CROSS-REFERENCE TO RELATED APPLICATIONS

This application is based upon and claims the benefit of the priority of Japanese patent application No. 2010-117160, filed on May 21, 2010, the disclosure of which is incorporated herein in its entirety by reference thereto.

TECHNICAL FIELD

The present invention relates to a communication control device, and particularly to a communication control device having a plurality of endpoints, data communication method and a program adapted for a plurality of endpoints.

BACKGROUND

Figure 3:
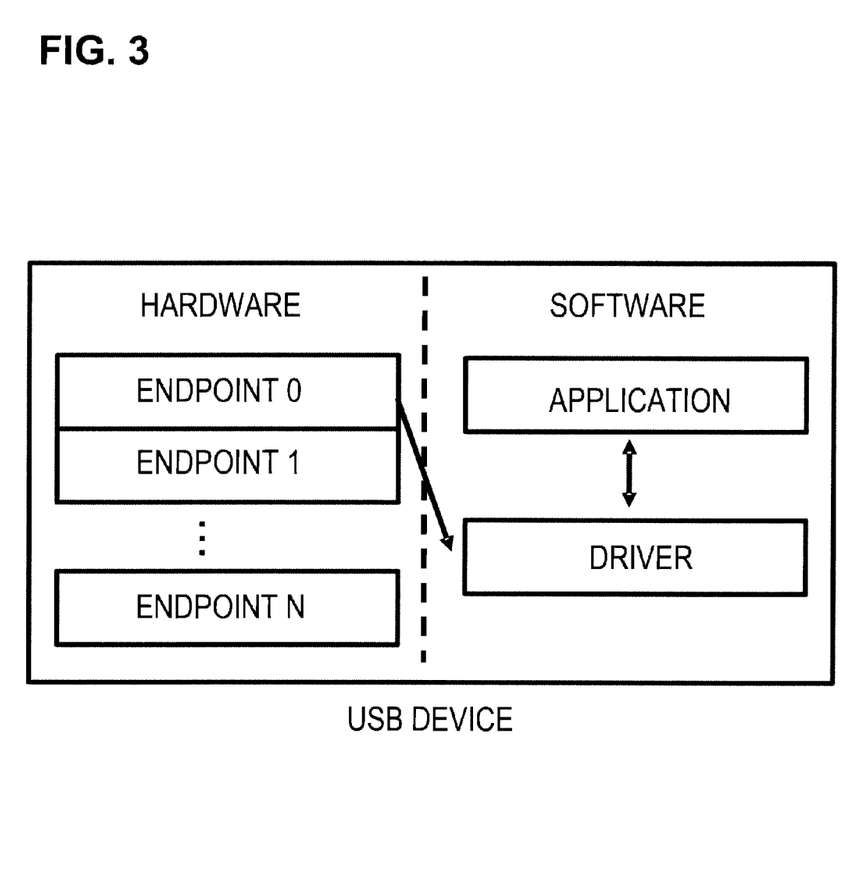
FIG. 3 is a reference diagram within a USB controller having a plurality of endpoints.

In recent years, USB (Universal Serial Bus) is widely used as one of the serial bus protocol standards in which peripheral devices are connected to personal computers and home electric appliances. Physically speaking, communication is achieved serially in the USB protocol, however, a USB controller having a plurality of endpoints is able to perform communication independently by using each endpoint (refer to FIG. 3).

Patent Document 1 discloses a USB controller having a double buffer configuration comprising a dedicated buffer corresponding to each endpoint and a common buffer used by all the endpoints. According to the Patent Document 1, when the common buffer is allocated to the endpoints at the time of data transfer, the data is transferred by controlling the dedicated buffer and the common buffer. Further, when the common buffer is not allocated, the data transfer is performed in a double buffer configuration by having a buffer switch control device determine whether or not a read buffer of another endpoint to which the common buffer is allocated is vacant and allocate the vacant buffer to an endpoint communicating data.

As described, USB controllers that demonstrate high communication performance while the circuit size is kept to a minimum are developed. Meanwhile, in order to improve the maximum transfer rate, the USB standard has been expanded and USB 3.0 (Non-Patent Document 1) achieving a speed of 5 Gbit/s as the maximum data transfer rate has started to spread. In USB 3.0, in order to achieve the transfer rate above, burst transfer is defined, in addition to the transfer modes of USB 2.0 such as the control transfer and bulk transfer. The burst transfer is a procedure for performing high-speed data transfer, and the transfer rate is improved by partially omitting specification of addresses when continuous data are transferred.

[Patent Document 1]
Japanese Patent Kokai Publication No. JP-P2002-9849A, which corresponds to US 2001/056513A1.
[Non-Patent Document 1]
USB Implementers Forum, Inc, "USB 3.0 Specification," Nov. 12, 2008, [online], [searched on Apr. 20, 2010], the Internet <URL: http://www.usb.org/developers/docs/>

SUMMARY

The entire disclosure of Patent Documents 1 and Non-Patent Document 1 are incorporated herein by reference thereto.

The following analysis is given from the standpoint of the present invention.

As described above, burst transfer and independent communication by a plurality of endpoints are possible in USB 3.0, however, the buffer capacity of a USB controller must be expanded in order to support such communication.

For instance, when the technology disclosed in Patent Document 1 is applied to a USB controller capable of burst transfer and having a plurality of endpoints, the capacity of the dedicated buffer must be increased since the transfer data amount (the number of packets) continuously transmitted by a host varies. In other words, since one packet's worth of a buffer is provided for each of the USB and CPU sides in the configuration of Patent Document 1, each endpoint must have a dedicated buffer having a capacity of the packet size×the maximum burst length and a common buffer similarly having a capacity of the packet size×the maximum burst length must be added in a burst transfer continuously transferring a plurality of packets as one burst.

However, such a configuration will increase the circuit size. When the capacity of the dedicated buffer is increased, the circuit size increases, resulting in higher product costs. Further, in a configuration in which the dedicated buffer and the common buffer have a capacity of the packet size×the maximum burst length, when a series of burst transfer continues, even if a first burst transfer is received, the common buffer cannot be secured on time when the first packet of a next burst transfer is received. As a result, flow control will be required and the transfer rate may decrease.

As described above, there is much desired in the conventional technology.

In an aspect of the present invention, a communication control device, data communication method, and computer readable medium embedded program that efficiently control a dedicated buffer and a common buffer during a burst transfer while reducing the circuit size are desired.

According to a first aspect of the present invention, there is provided a communication control device including a plurality of reception controllers capable of receiving data in a burst transfer mode in which a plurality of packets are continuously transferred as one burst. The communication control device includes a plurality of dedicated buffers having a capacity of at least one packet and corresponding to the reception controllers, respectively, and a plurality of common buffers having a capacity of at least the number of packets continuously transferred in the burst transfer mode and shared by a plurality of the reception controllers. A first packet is buffered in the dedicated buffer when the burst transfer mode is started and subsequent packets in the common buffer.

According to a second aspect of the present invention, there is provided a data communication method operable in a communication control device having a plurality of reception controllers capable of receiving data in a burst transfer mode in which a plurality of packets are continuously transferred as one burst; a plurality of dedicated buffers having a capacity of at least one packet and corresponding to the reception controllers, respectively, and a plurality of common buffers having a capacity of at least the number of packets continuously transferred in the burst transfer mode and shared by a plurality of the reception controllers. The method includes buffering a first packet in the dedicated buffer when the burst transfer mode is started, and buffering subsequent packets in the common buffer.

According to a third aspect of the present invention, there is provided a program having a computer constituting a communication control device including a plurality of reception controllers capable of receiving data in a burst transfer mode in which a plurality of packets are continuously transferred as one burst; a plurality of dedicated buffers having a capacity of at least one packet and corresponding to the reception controllers, respectively, and a plurality of common buffers having a capacity of at least the number of packets continuously transferred in the burst transfer mode and shared by a plurality of the reception controllers. The program includes executing of buffering a first packet in the dedicated buffer when the burst transfer mode is started, and buffering subsequent packets in the common buffer. The program may be embedded in a nontransitory computer readable medium.

The meritorious effects of the present invention are summarized as follows.

According to each aspect of the present invention, high-speed data communication can be achieved with a configuration that reduces the size of buffers in an independent communication system for each endpoint.

PREFERRED MODES

Next, preferred modes of the present disclosure will be described with reference to the drawings, which, however, should not be regarded as limitation, the reference to the drawings being presented merely by way of example for illustration of the disclosure.

Figure 1:
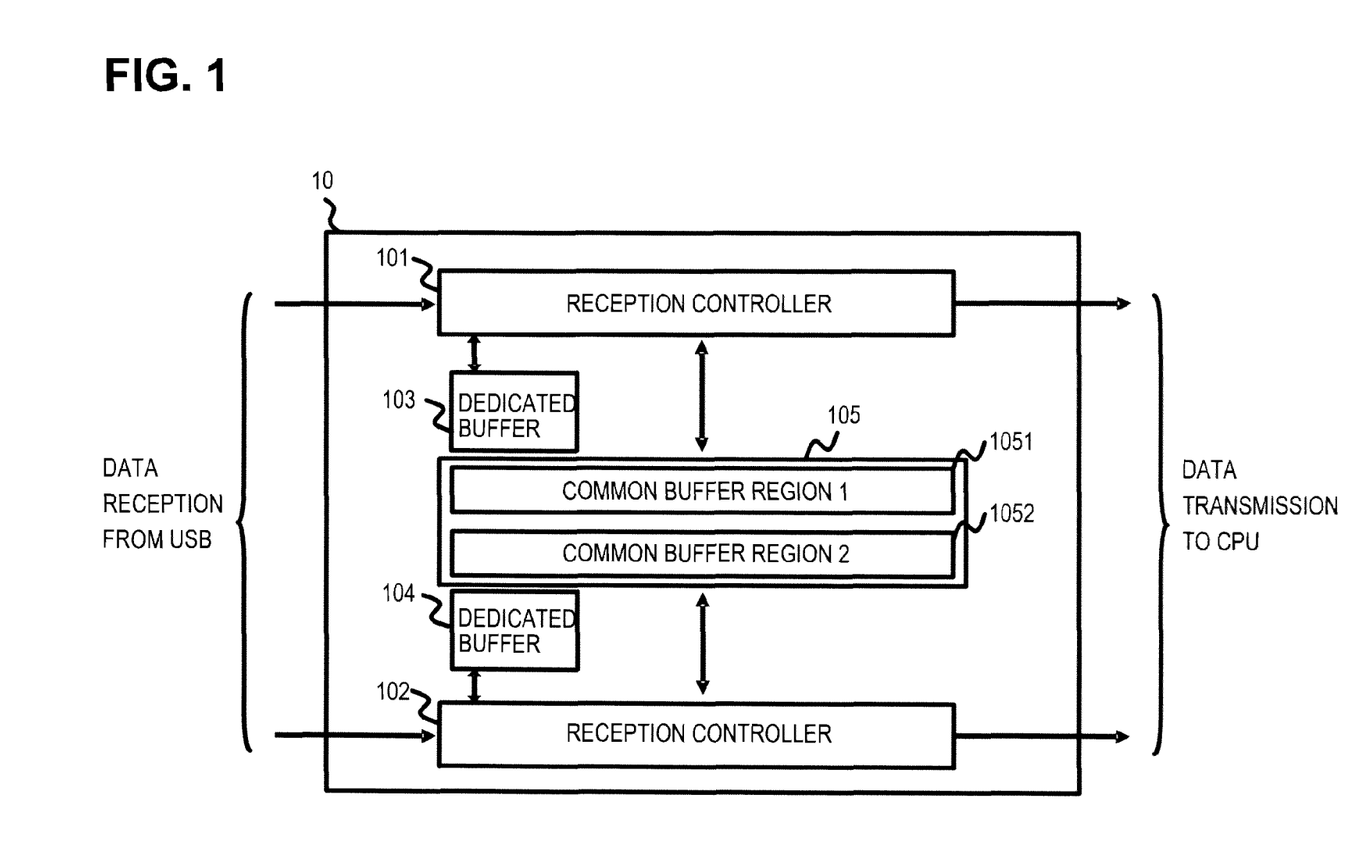
FIG. 1 is a block diagram of a USB endpoint controller according to an example.

First, a summary of the preferred modes will be given. FIG. 1 shows a configuration of a USB endpoint controller. In order to support a burst transfer defined in the USB 3.0 standard, a dedicated buffer having a size corresponding to the size of one packet is secured for each endpoint. Further, one unit of a common buffer is defined as a size of the packet size×the maximum burst length, and a plurality of these common buffers are provided. High-speed data communication is achieved while keeping the size of the entire buffer to a minimum by properly controlling the dedicated buffers and the common buffers.

When a burst transfer between USB devices starts, a USB device controller stores a first packet in a dedicated buffer 103. At this point, a common buffer 1051 has not been secured yet, and since a next packet cannot be received in this state, the common buffer is secured. After the common buffer has been successfully secured, packets following the first packet are stored in the common buffer. Since a capacity corresponding to the packet size×the maximum burst length is secured as the size of the common buffer 1051 and the first packet has been received by the dedicated buffer, the data capacity stored in the common buffer is a size corresponding to the packet size×(the maximum burst length−1). In other words, the common buffer still has room to store a packet (refer to FIG. 2).

Figure 2:
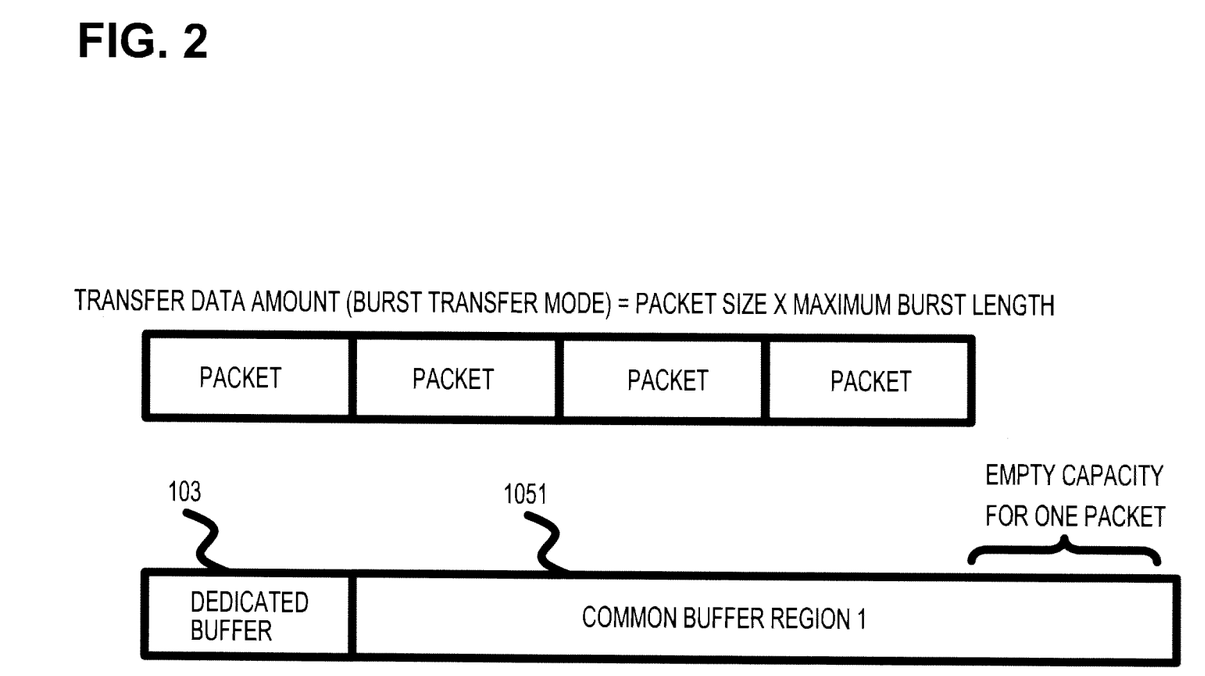
FIG. 2 is a diagram showing the relation between a transfer data amount and a dedicated buffer and a common buffer when a burst transfer is performed in FIG. 1.

Since there is always room for one packet when a burst transfer has been completed, the first packet of a next burst transfer can be reliably received even if data in a common buffer secured in the beginning has not been read and another buffer needs to be secured. As a result, during the reception of the first packet of the next burst transfer, it is possible to request the securing of another common buffer.

As described, the burst transfer defined in USB 3.0 is supported by minimizing the size of the dedicated buffer to the size of one packet, having a size corresponding to the packet size×the maximum burst length as the size of the common buffer, thereby always creating room for one packet, and effectively utilizing this room for one packet. In the following detailed disclosure is given on various embodiments of the present disclosure.

First Embodiment

Figure 4:
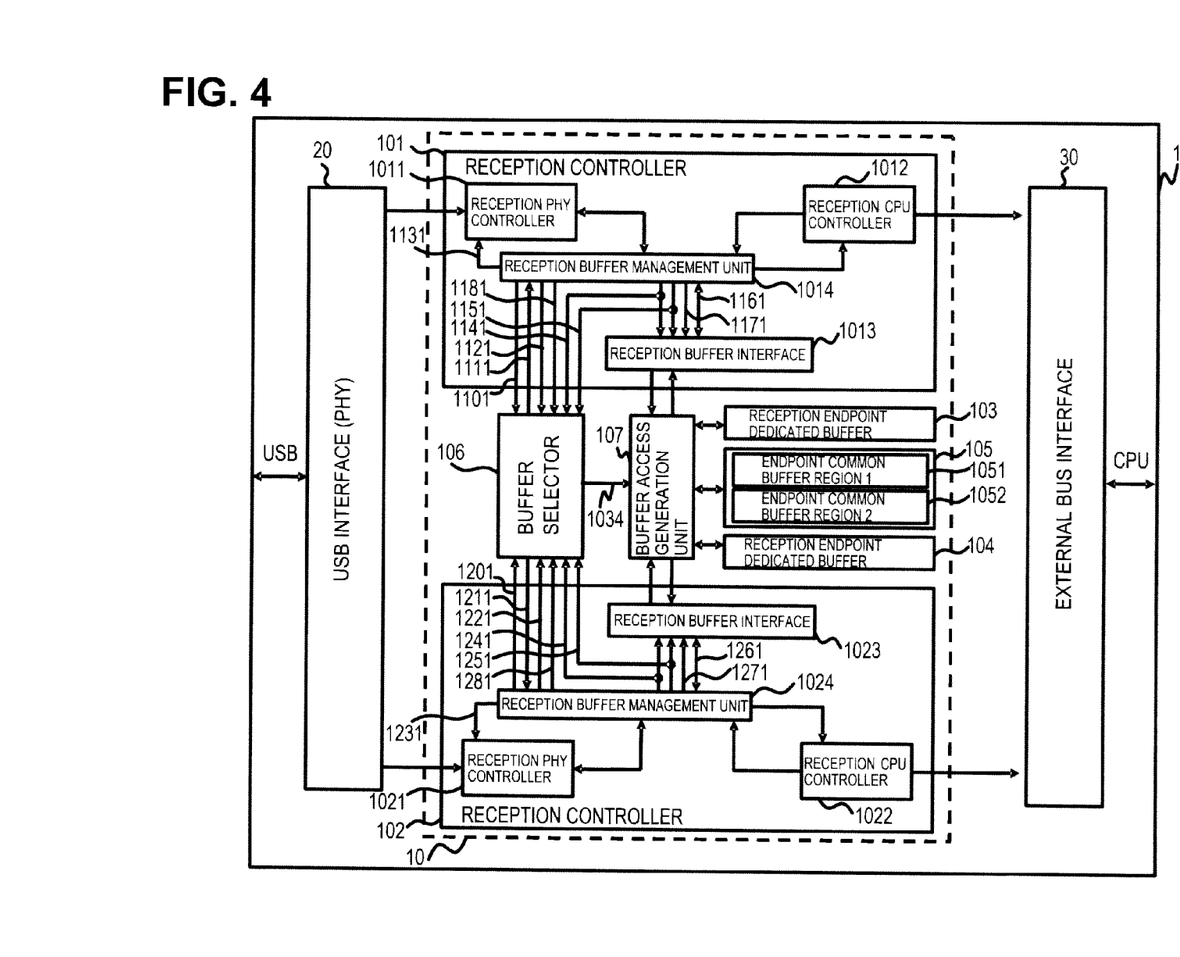
FIG. 4 is a detailed block diagram of the entire USB controller according to an example.

Next, the configuration of an embodiment of the present disclosure is described in detail, and then the operation of each constituent element and cooperation between constituent elements will be described in detail. FIG. 4 shows a configuration example of a USB device controller relating to an embodiment of the present disclosure.

The USB device controller 1 is constituted by a USB endpoint controller 10, a USB interface 20, and an external bus interface 30.

The USB endpoint controller 10 receives a data transmission/reception request from a host and manages data transmission/reception. In addition to converting an analog signal received from a USB into a digital one and correcting an error, the USB interface 20 converts a digital signal from the host into an analog signal and transmits the converted signal to the USB. The external bus interface 30 controls a bus connected to a CPU (Central Processing Unit) or a DMA (Direct Memory Access) controller of a peripheral device and transmits/receives data between these devices. The USB endpoint controller 10 is constituted by reception controllers 101 and 102, a buffer selector 106, a buffer access generation unit 107, reception endpoint dedicated buffers 103 and 104, and an endpoint common buffer 105.

The USB standard supports a plurality of endpoints, and in the present embodiment, a case where two endpoints are supported is assumed and described. An endpoint controlled by the reception controller 101 is called "the first endpoint" and an endpoint controlled by the reception controller 102 is called "the second endpoint." Note that the reception controller 102 is configured identically to the reception controller 101. Therefore, an explanation of the reception controller 102 will be omitted.

The reception controller 101 receives a data transmission/reception request from the USB interface 20 and the external bus interface 30, and manages read/write of data. The buffer selector 106 controls a common buffer securing request and a common buffer releasing request from the reception controller 101. The buffer access generation unit 107 performs read/write of data on a secured dedicated buffer and common buffer according to a write request or read request from the reception controller 101. A one-to-one correspondence is made between the reception endpoint dedicated buffer and the reception controller; the reception endpoint dedicated buffer 103 corresponds to the first endpoint and the reception endpoint dedicated buffer 104 corresponds to the second endpoint. The endpoint common buffer 105 is a buffer commonly shared by all the endpoints.

The reception controller 101 is constituted by a reception PHY (Physical Layer) controller 1011, a reception CPU controller 1012, a reception buffer interface 1013, and a reception buffer management unit 1014.

The reception PHY controller 1011 receives a packet digitally converted by the USB interface 20, performs protocol control on this packet, and sends normally received data to the reception buffer management unit 1014. Further, the reception PHY controller 1011 performs the flow control defined in the USB 3.0 standard when the reception buffer management unit 1014 notifies a buffer empty signal 1131.

When receiving a read request of received data via the external bus interface 30, the reception CPU controller 1012 outputs a read request signal to the reception buffer management unit 1014 and outputs read data to the external bus interface 30 via the reception buffer management unit 1014.

The reception buffer interface 1013 generates an access timing signal for the buffer access generation unit 107 according to a write request and a read request notified from the reception buffer management unit 1014. In other words, upon receiving a buffer write request signal 1141, a data signal 1161, and an address signal 1171 from the reception buffer management unit 1014, the reception buffer interface 1013 generates the access timing signal including a write address and write data for the buffer access generation unit 107. Upon receiving this signal, the buffer access generation unit 107 writes data in the reception endpoint dedicated buffer 103 or the endpoint common buffer 105.

Next, upon receiving a buffer read request signal 1151 from the reception buffer management unit 1014, the reception buffer interface 1013 generates an access timing signal including a read address for the buffer access generation unit 107. Upon receiving this signal, the buffer access generation unit 107 outputs read data read from the reception endpoint dedicated buffer 103 or the endpoint common buffer 105 to the reception buffer management unit 1014 as the data signal 1161 and the address signal 1171.

The reception buffer management unit 1014 controls the securing of the common buffer and a release request, and manages the status of the secured common buffer, the reception status of the reception PHY controller 1011, and the read status from the reception CPU controller 1012. Further, when the reception buffer management unit 1014 receives data from the reception PHY controller 1011 and the necessity to secure the common buffer arises, the reception buffer management unit 1014 asserts a common buffer securing request signal 1101 to the buffer selector 106. By receiving a common buffer securing receipt signal 1111 from the buffer selector 106, the reception buffer management unit 1014 recognizes that the common buffer securing request has been accepted.

Meanwhile, when releasing the common buffer, the reception buffer management unit 1014 asserts a common buffer release request signal 1121 to the buffer selector 106.

Further, the reception buffer management unit 1014 has the function of notifying the buffer empty signal 1131 indicating whether or not data can be received from the USB to the reception PHY controller 1011.

Here, a procedure in which the reception buffer management unit 1014 writes data normally received from the reception PHY controller loll in a buffer will be described. Upon normally receiving data from the reception PHY controller 1011, the reception buffer management unit 1014 outputs the buffer write request signal 1141 to the reception buffer interface 1013 and simultaneously outputs the address signal 1171 and the data signal 1161. Further, to the buffer selector 106, in addition to the buffer write request signal 1141, the reception buffer management unit 1014 outputs a buffer region selection signal 1181 specifying in what order data is written in a buffer region secured in the dedicated buffer 103 or the endpoint common buffer 105.

Next, a read procedure in a case where the reception buffer management unit 1014 receives a read request from the reception CPU controller 1012 will be described. In order to read data, the reception buffer management unit 1014 outputs the buffer read request signal 1151 to the reception buffer interface 1013, simultaneously outputs the address signal 1171, and outputs read data received from the data signal 1161 to the reception CPU controller 1012. Further, to the buffer selector 106, in addition to the buffer read request signal 1151, the reception buffer management unit 1014 outputs the buffer region selection signal 1181 specifying in what order data is read from a buffer region secured in the dedicated buffer 103 or the endpoint common buffer 105.

The reception controller 101 operates as described above. Next, the buffer selector 106 will be described.

When receiving the common buffer securing request signal 1101 from the reception buffer management unit 1014, the buffer selector 106 starts to secure the endpoint common buffer 105 and asserts a common buffer securing receipt signal 1111 when the common buffer has been secured. On the other hand, when receiving a common buffer release request from the reception buffer management unit 1014, the buffer selector 106 immediately releases the endpoint common buffer 105. When there is write access or read access from the reception buffer management unit 1014, the buffer selector 106 judges which endpoint is accessing based on the buffer region selection signal 1181 notified at the same time. Based on this judgment result, the buffer selector 106 outputs a buffer selection signal 1034 for determining which buffer region should be accessed, the reception endpoint dedicated buffer 103 or endpoint common buffer regions 1051 and 1052 constituting the endpoint common buffer 105, to the buffer access generation unit 107.

Figure 6:
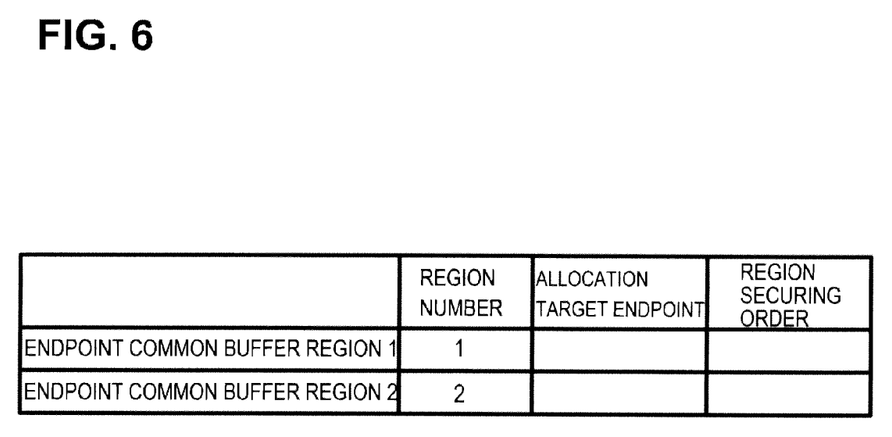
FIG. 6 is an example of a table for managing a common buffer.

The buffer selector 106 has a buffer selection control table. The buffer selector 106 manages the endpoint common buffer 105 according to this table. FIG. 6 shows the contents of the table. The buffer selection control table has three fields for each endpoint common buffer region: a region number field, an allocation target endpoint field, and a region securing order field.

The region number field is a field for uniquely distinguishing the endpoint common buffer regions 1051 and 1052; region number 1 is assigned to the endpoint common buffer region 1051 and region number 2 is assigned to the endpoint common buffer region 1052 in FIG. 6. The allocation target endpoint field is a field for indicating which endpoint is using an endpoint common buffer region. Since two endpoints are assumed in FIG. 6, the field is managed by assigning "1" to the first endpoint and "2" to the second endpoint. Further, when the allocation target endpoint field shows "0," the endpoint region in question is not used by any endpoint. The region securing order field is a field for indicating in what position an endpoint common buffer region is allocated to the allocation target endpoint.

The buffer selector 106 operates as described above. Next, the buffer access generation unit 107 will be described.

The buffer access generation unit 107 selects a region from the reception endpoint dedicated buffers 103 and 104, and the endpoint common buffer regions 1051 and 1052 based on the buffer selection signal 1034 from the buffer selector 106. Further, the buffer access generation unit 107 outputs a read or write access timing signal received from the reception buffer interface 1013 or 1023 of the access target endpoint selected by the buffer selection signal 1034.

In a case of read access, data read from the selected buffer is outputted to the reception buffer interface 1013 or 1023 of the access target endpoint.

Next, the capacities of the buffers will be described. The capacity of the reception endpoint dedicated buffers 103 and 104 is a size corresponding to one packet. Further, the endpoint common buffer 105 is constituted by the endpoint common buffer regions 1051 and 1052, each of which has a capacity corresponding to the packet size×the maximum burst length.

The USB device controller 1 is configured as described above.

Figure 5:
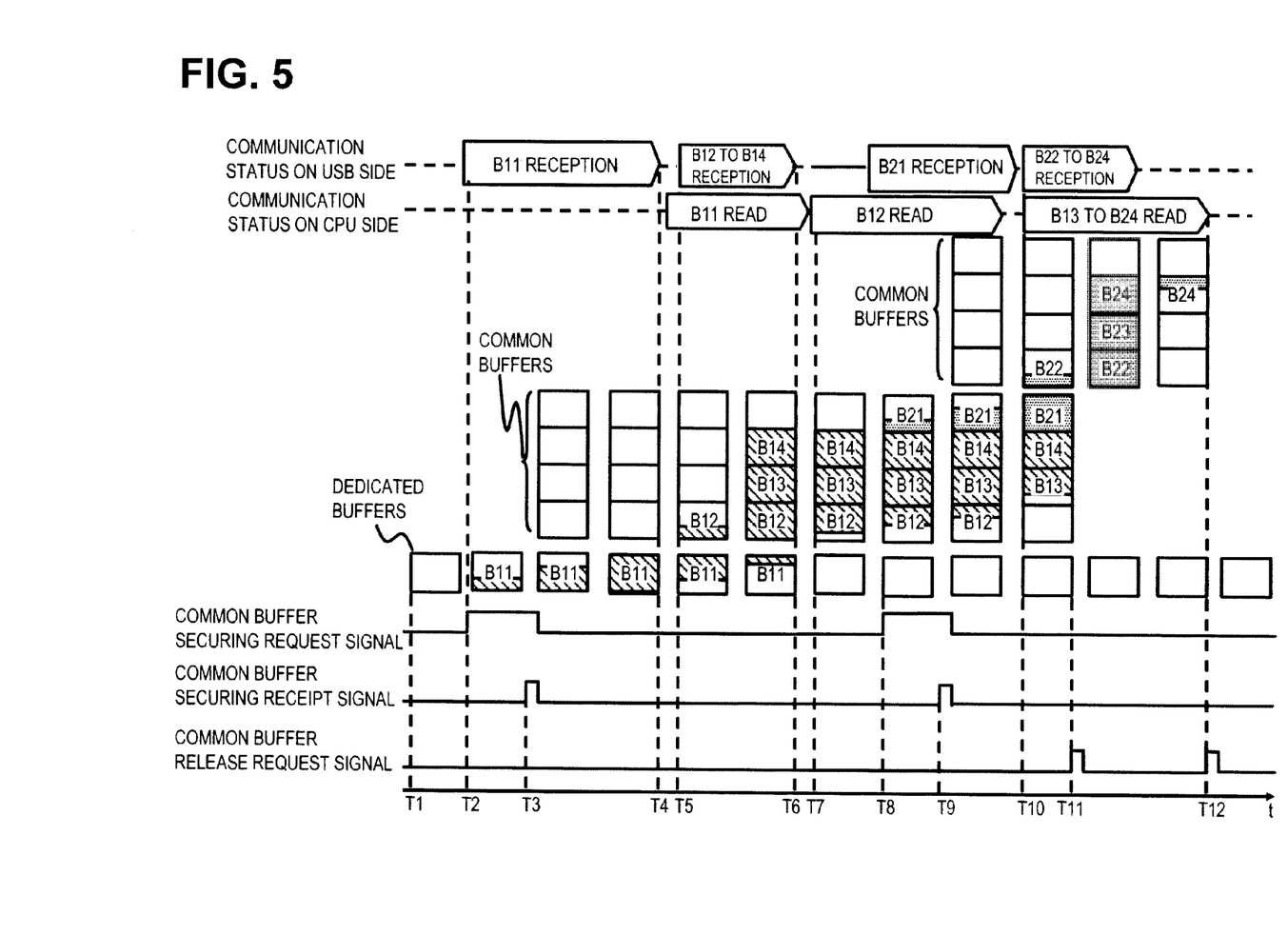
FIG. 5 is a status transition diagram of buffers in an example.

Next, the operation of each constituent element and cooperation between constituent elements will be described in detail. FIG. 5 is a drawing showing the operation of the present embodiment, and the operation of the USB device controller 1 configured as shown in FIG. 4 will be described using FIG. 5. Since the first endpoint and the second endpoint operate identically, only the operation of the first endpoint will be described. Further, in the present embodiment, the maximum burst length is assumed to be four packets. FIG. 5 shows the communication statuses of the USB side and the CPU side, the statuses of the reception endpoint dedicated buffer 103 and the endpoint common buffer regions 1051 and 1052, the status transitions of the reception buffer management unit 1014, and the operations of the common buffer securing request signal 1101, the common buffer securing receipt signal 1111, and the common buffer release request signal 1121 at timings T1 to T12. Further, the communication statuses are indicated by B11 to B14 and B21 to B24, and each is an OUT transaction. In other words, each of them represents one packet. The communication mode of USB is the burst transfer, and packets B11 to B14 or packets B21 to B24 represents a single burst transfer unit.

Figure 7:
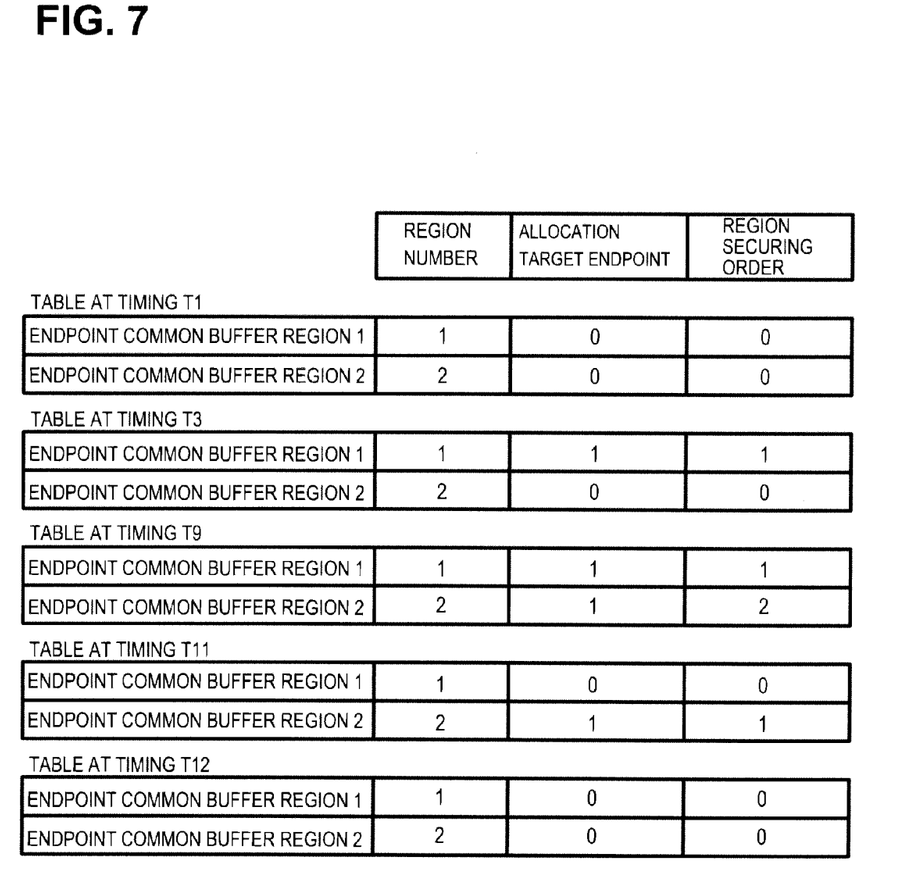
FIG. 7 shows values in the table in FIG. 6 corresponding to the status transitions in FIG. 5.

The timing T1 indicates an initial state where no communication is performed on the USB or CPU side. During the initial state, the reception endpoint dedicated buffer 103 and the endpoint common buffer regions 1051 and 1052 are not used, and both Number 1 and 2 in the region number fields have "0" in the allocation target endpoint fields in the buffer selection control table (refer to the table at T1 in FIG. 7).

At the timing T2, the first packet B11 of a first burst is received from the USB side. The reception PHY controller 1011 outputs the received packet B11 to the reception buffer management unit 1014. Upon the start of the reception of B11, since no empty region for receiving the next packet B12 is left when the reception of the packet B11 is completed, the reception buffer management unit 1014 asserts the buffer empty signal 1131 to the reception PHY controller 1011, and simultaneously asserts the common buffer securing request signal 1101 to the buffer selector 106 in order to receive the next packet.

Here, a process for writing a received packet to the dedicated buffer will be described. To the buffer selector 106, the reception buffer management unit 1014 asserts the buffer write request signal and the buffer region selection signal 1181 specifying the reception endpoint dedicated buffer 103 as the buffer where data is written. At the same time, the reception buffer management unit 1014 outputs the buffer write request signal 1141, the address signal 1171, and the data signal 1161 to the reception buffer interface 1013. Since the buffer region selection signal 1181 specifying the reception endpoint dedicated buffer 103 is asserted to the buffer selector 106 by the reception buffer management unit 1014, the buffer selection signal 1034 specifying the reception endpoint dedicated buffer 103 is outputted to the buffer access generation unit 107. The buffer access generation unit 107 selects the reception endpoint dedicated buffer 103 according to the buffer selection signal 1034 and writes write data to a write address specified by a write timing signal generated by the reception buffer interface 1013.

At the timing T3, continued from the timing T2, the first packet B11 of the first burst is still being received from the USB side, and the dedicated buffer write processing is being performed as at the timing T2. Upon recognizing that the reception buffer management unit 1014 has asserted the common buffer securing request signal 1101, the buffer selector 106 searches whether or not the common buffer can be secured based on the buffer selection control table. More concretely, the buffer selector 106 determines if there is any region having "0" in its allocation target endpoint field among all the region numbers in the buffer selection control table, and if there is a region having "0," it writes the endpoint number of the access target endpoint in the allocation target endpoint field of that region. Further, the securing of the common buffer is completed by writing in a value, obtained by adding one to the maximum value in the region securing order fields of the regions used, in the region securing order field of the target region. Meanwhile, if there is no region that can be secured in the buffer selection control table, no processing will be performed on the buffer selection control table.

Since the allocation target endpoint fields of the endpoint common buffer regions 1 and 2 are originally "0," "1" indicating the first endpoint is written into the allocation target endpoint field of the endpoint common buffer region 1051 and "1" indicating that the region is secured for the first time is written into the region securing order field. By doing this, the securing of common buffer with the endpoint common buffer region 1051 as a storing region is completed for the first endpoint (refer to the table at the timing T3 in FIG. 7). Once the region has been secured, the common buffer securing receipt signal 1111 is asserted and notified to the reception buffer management unit 1014. After recognizing the assertion of the common buffer securing receipt signal 1111, the reception buffer management unit 1014 negates the common buffer securing request signal 1101. Meanwhile, when the common buffer cannot be secured, the common buffer securing receipt signal 1111 is not asserted.

At the timing T4, the reception of the first packet B11 of the first burst from the USB side has been completed. The packet B11 is stored in the reception endpoint dedicated buffer 103, enabling the CPU side to read the data, and it becomes possible to receive a next packet at the same time.

Here, a process for reading data stored in the reception endpoint dedicated buffer 103 from the CPU side will be described below. When the CPU side starts to read data from the buffer, the reception CPU controller 1012 outputs a data read request to the reception buffer management unit 1014. To the buffer selector 106, the reception buffer management unit 1014 asserts the buffer read request signal 1151 and the buffer region selection signal 1181 specifying the reception endpoint dedicated buffer 103 as the buffer from which data is read. Further, in addition to the buffer read request signal 1151, the address signal 1171 is outputted to the reception buffer interface 1013, and data is read from the reception endpoint dedicated buffer 103 and outputted to the reception CPU controller 1012. Since the reception buffer management unit 1014 has asserted the buffer region selection signal 1181 indicating the reception endpoint dedicated buffer 103, the buffer selector 106 outputs the buffer selection signal 1034 indicating the reception endpoint dedicated buffer 103 to the buffer access generation unit 107. The buffer access generation unit 107 selects the reception endpoint dedicated buffer 103 based on the buffer selection signal 1034, reads data from a read address specified by a read timing signal generated by the reception buffer interface 1013, and outputs the data to the reception CPU controller 1012 via the reception buffer interface 1013 and the reception buffer management unit 1014. Further, the read data is outputted to the CPU side via the external bus interface 30.

At the timing T5, the reception of the packet B12, the second packet of the burst transfer, from the USB side has started. The packet B12 is stored in the endpoint common buffer region 1051, the common buffer already secured. A process for writing the received packet to the common buffer will be described. The reception buffer management unit 1014 calculates the packets received by the reception PHY controller 1011, asserts the buffer write request signal 1141 and the buffer region selection signal 1181 indicating in what position the common buffer is secured to the buffer selector 106, and simultaneously outputs the buffer write request signal 1141, the address signal 1171, and the data signal 1161 to the reception buffer interface 1013. Since the buffer region selection signal 1181 indicating the already secured common buffer is asserted by the reception buffer management unit 1014, the buffer selector 106 searches an endpoint common buffer region having a value of the region securing order field matching the buffer region selection signal 1181 among the endpoint common buffer regions having matching values in their allocation target endpoint fields out of the endpoint common buffer regions in the buffer selection control table. Then the buffer selector 106 outputs the region number field of this endpoint common buffer region to the buffer access generation unit 107 as the buffer selection signal 1034. The buffer access generation unit 107 selects the endpoint common buffer region 1051 based on the buffer selection signal 1034, and writes write data to a write address specified by the write timing signal generated by the reception buffer interface 1013.

At the timing T6, the reception of the packets B11 to B14, the first burst transfer from the USB side, has been completed. At the timing T6, data stored in the reception endpoint dedicated buffer 103 is read as at the timing T4.

At the timing T7, the read operation of the packet B11 by the CPU side has been completed, and the read operation of the packet B12 has started. How the CPU side reads data in the dedicated buffer has been described above; therefore a process in which the CPU side reads data in the common buffer will be described. When the CPU side starts to read data in the buffer, the reception CPU controller 1012 outputs a read request to the reception buffer management unit 1014. The reception buffer management unit 1014 asserts the buffer read request signal 1151 and the buffer region selection signal 1181 indicating in what position the common buffer from which the data is read is secured to the buffer selector 106. Further, to the reception buffer interface 1013, the buffer read request signal 1151 and the address signal 1171 are outputted, and the data is read from the common buffer and outputted to the reception CPU controller 1012. In order to read from the common buffer secured first, the reception buffer management unit 1014 makes the buffer region selection signal 1181 "1" and notifies it to the buffer selector 106. Further, the buffer selector 106 searches in the buffer selection control table, determines that the endpoint common buffer region 1 having "1" in its allocation target endpoint field and "1" in the region securing order field is the specified buffer region, and outputs "1," the value in the region number field, to the buffer access generation unit 107 as the buffer selection signal 1034. The buffer access generation unit 107 selects the endpoint common buffer region 1051 based on the buffer selection signal 1034, reads data from a read address specified by the read timing signal generated by the reception buffer interface 1013, and outputs the data to the reception CPU controller 1012 via the reception buffer interface 1013 and the reception buffer management unit 1014. Further, the read data is outputted to the CPU side via the external bus interface 30.

At the timing T8, the reception of the first packet B21 of a second burst from the USB side has started. The packet B21 is stored in the endpoint common buffer region 1051 in the same procedure as the common buffer write processing described at the timing T5. Since there is no empty region in the endpoint common buffer region to receive the next packet B22 due to the start of reception of the packet B21, the reception buffer management unit 1014 asserts the buffer empty signal 1131 to the reception PHY controller 1011. At the same time, in order to receive a next packet, the common buffer securing request signal 1101 is asserted to the buffer selector 106.

At the timing T9, continued from the timing T8, the second packet B21 of the second burst is still being received from the USB side, and the packet B21 is stored in the endpoint common buffer region 1051 in the same procedure as the common buffer write processing described above. Further, the packets B12 to B14 received already can be read from the CPU side in the same procedure as the common buffer read processing described at the timing T7. After confirming the assertion of the common buffer securing request signal 1101, the buffer selector 106 secures the common buffer in the same procedure as the common buffer securing processing described at the timing T3. In other words, the buffer selector 106 searches in the buffer selection control table, determines that the allocation target endpoint field of the endpoint common buffer region 1051 is "1" and that the allocation target endpoint field of the endpoint common buffer region 1052 is "0." Then the buffer selector 106 writes "1" indicating the first endpoint into the allocation target endpoint field of the endpoint common buffer region 1052 and "2" indicating that the region is the second secured region into the region securing order field according to the determination results. After writing the data, the additional securing of the common buffer with the endpoint common buffer region 1052 as a storing region for the first endpoint is completed (refer to the table at the timing T9 in FIG. 7). After the common buffer has been secured, the buffer selector 106 asserts the common buffer securing receipt signal 1111 and notifies it to the reception buffer management unit 1014. The reception buffer management unit 1014 recognizes the assertion of the common buffer securing receipt signal 1111 and negates the common buffer securing request signal 1101.

At the timing T10, the reception of the packet B22, the second packet of the second burst from the USB side, has been started. The packet B22 is stored in the endpoint common buffer region 1052 in the same procedure as the common buffer write processing described at the timing T5. The packets B13, B14, and B21 already stored in the common buffer can be read from the CPU side in the same procedure as the common buffer read processing described at the timing T7.

At the timing T11, the read operation of the packets B12 to B14 and B21 stored in the endpoint common buffer region 1051 has been completed. At this point, all the data stored in the endpoint common buffer region 1051 have been read by the CPU side, and therefore this common buffer region is released.

Common buffer release processing will be described below. The reception buffer management unit 1014 asserts the common buffer release request signal 1121 to the buffer selector 106. Upon recognizing the assertion of the common buffer release request signal 1121, the buffer selector 106 performs release processing on the endpoint common buffer of a release target endpoint for a region having a matching allocation target endpoint field in the buffer selection control table. When a value in the target endpoint field of any endpoint common buffer region in the buffer selection control table matches the number of the release target endpoint, a value obtained by subtracting one from a value already written in the corresponding region securing order field is written in. Particularly, when the value in the region securing order field of the region in question is "1," "0" indicating the region is not used is written into the target endpoint field and the region securing order field. Since the values in the target endpoint field and the region securing order field of the endpoint common buffer region 1051 are both "1," the buffer selector 106 sets the target endpoint field and the region securing order field of the endpoint common buffer region 1051 to "0." Further, since the value in the target endpoint field of the endpoint common buffer region 1052 is "1" and the value in the region securing order field is "2," setting the region securing order field of the endpoint common buffer region 1052 to "1" by subtracting one from the current value will achieve a state in which only the endpoint common buffer region 1052 is secured (refer to the table at the timing T11 in FIG. 7). The packets B22 to B24 secured in the endpoint common buffer region 1052 can be read from the CPU side in the same procedure as the common buffer read processing described at the timing T7.

At the timing T12, the read operation of the packets B22 to B24 stored in the endpoint common buffer region 1052 has been completed, and the reception buffer management unit 1014 asserts the common buffer release request signal 1121 to the buffer selector 106. The buffer selector 106 releases the common buffer in the same procedure as the common buffer release processing described at the timing T11. In other words, since the value in the target endpoint field of the endpoint common buffer region 1052 is "1" and the value in the region securing order filed is also "1," the buffer selector 106 completes the release of the entire common buffer by setting the target endpoint field of the endpoint common buffer region 1052 to "0" thereby restoring the initial state (refer to the table at the timing T12 in FIG. 7).

As described, by adding the common buffer having a capacity of the packet size×the maximum burst length to the dedicated buffer thereby configuring a buffer having a capacity of (the burst length+1), a capacity of the dedicated buffer allocated to an endpoint that is not actually performing communication can be kept to a minimum, the required buffer capacity can be reduced, and an increase in circuit size can be prevented. Further, since room for receiving one packet can always be secured in the buffer even after all the packets in a burst have been received, a packet of a next burst can be continuously received eliminating the necessity to switch over to flow control, and there is no decrease in the communication speed.

Here, the required buffer size in the present embodiment is inspected and compared to that in the method disclosed in Patent Document 1. The packet size defined by USB 3.0 is 1024 bytes, and the inspection is conducted assuming that the maximum burst length is four packets and the number of endpoints supported is two. In the method in Patent Document 1, a size calculated by the following expression is required for the reception endpoint dedicated buffer.

$$\begin{aligned}\text{The dedicated buffer capactiy} &= \text{the maximum burst length} \times \\ &\quad \text{the packet size} \times \\ &\quad \text{the number of endpoints} \\ &= 4 \times 1024 \times 2 \\ &= 8192 \text{ bytes}\end{aligned}$$

A size calculated by the following expression is required for the common buffer.

$$\begin{aligned}\text{The common buffer capacity} &= \text{the maximum burst length} \times \\ &\quad \text{the packet size} \\ &= 4 \times 1024 \\ &= 4096 \text{ bytes}\end{aligned}$$

In total, a buffer size of 12288 bytes is required.

Meanwhile, in the present embodiment, since only the size of one packet is required as the capacity of the reception endpoint dedicated buffer for each endpoint, a buffer size calculated by the following expression is required for the reception endpoint dedicated buffer.

$$\begin{aligned}\text{The dedicated buffer capacity} &= \text{the packet size} \times \\ &\quad \text{the number endpoints} \\ &= 1024 \times 2 \\ &= 2048 \text{ bytes}\end{aligned}$$

The common buffer requires a size calculated by the following expression.

$$\begin{aligned}\text{The common buffer capacity} &= \text{the maximum burst length} \times \\ &\quad \text{the packet size} \times \\ &\quad \text{the number of common buffer regions} \\ &= 4 \times 1024 \times 2 \\ &= 8192 \text{ bytes}\end{aligned}$$

In total, a buffer size of 10240 bytes is required.

As described, the burst transfer of USB 3.0 can be supported with a smaller buffer capacity.

It should be noted that the number of endpoints supported is not limited to two and the embodiment can be applied to a plurality of endpoints. In other words, reception controllers and reception endpoint dedicated buffers corresponding to the number of endpoints used are provided, and the same number of regions as the number of the endpoint common buffer regions can be selectable in the buffer selection control table. As a result, since any number of endpoints can share the endpoint common buffer, by properly selecting a capacity of the endpoint common buffer, the used amount of the buffer can be reduced and an increase in circuit size can be prevented.

As a computer readable medium for supplying the program codes, a flexible disk, hard disk, optical disk, magnetooptical disk, CD-ROM, CD-R, nonvolatile memory card, ROM, or the like can be used.

Further, the disclosure of Patent Document and Non-Patent Document abovementioned is incorporated herein by reference thereto. It should be noted that other objects, features and aspects of the present invention will become apparent in the entire disclosure and that modifications may be done without departing the gist and scope of the present disclosure as disclosed herein and claimed as appended herewith.

Also it should be noted that any combination and/or selection of the disclosed and/or claimed elements, matters and/or items may fall under the modifications aforementioned.

What is claimed is:

1. A communication control device comprising: a plurality of reception controllers capable of receiving data in a burst transfer mode in which a plurality of packets are continuously transferred as one burst; a plurality of dedicated buffers having a capacity of at least one packet and corresponding to said reception controllers, respectively; and a plurality of common buffers having a capacity of at least the number of packets continuously transferred in said burst transfer mode and shared by a plurality of said reception controllers; wherein when said burst transfer mode is started, a first packet of a burst is buffered in at least one of said dedicated buffers and subsequent packets of said burst are buffered in at least one of said common buffers, wherein said first packet of said burst is buffered in said at least one of said dedicated buffer and said subsequent packets of said burst are buffered in a region of said at least one of said common buffers, wherein when a burst transfer has been completed, said region of said at least one of said common buffers has an empty region having a size of at least one packet in said at least one of said common buffers, wherein said at least one of said common buffers is adapted for buffering a first packet of a subsequent burst transfer in said empty region and continuing to buffer subsequent packets by securing another region of said at least one of said common buffers in said burst transfer mode, and wherein said region of said at least one of said common buffers has a size corresponding to a packet size×a maximum burst length.

2. The communication control device as defined in claim 1, further comprising a buffer selector selecting a buffer in which a packet is buffered and notifying the selected buffer to said plurality of reception controllers.

3. The communication control device as defined in claim 2, wherein said buffer selector is adapted for managing said common buffers using a table having a field that identifies said common buffers, a field that identifies said reception controllers using said common buffers, and a field that indicates the order in which said common buffers are secured.

4. The communication control device as defined in claim 2, wherein said buffer selector is adapted for responding to a request to secure said at least one of said common buffers from said reception controller by securing an empty common buffer out of said common buffers.

5. The communication control device as defined in claim 1, wherein said reception controller is adapted for starting flow control only when said common buffers cannot be secured.

6. The communication control device as defined in claim 1, receiving packets in the burst transfer mode defined in the USB 3.0 standard.

7. A data communication method operable in a communication control device having: a plurality of reception controllers capable of receiving data in a burst transfer mode in which a plurality of packets are continuously transferred as one burst; a plurality of dedicated buffers having a capacity of at least one packet and corresponding to said reception controllers; and a plurality of common buffers having a capacity of at least the number of packets continuously transferred in said burst transfer mode and shared by a plurality of said reception controllers; said data communication method comprising: buffering a first packet of a burst in at least one of said dedicated buffers when said burst transfer mode is started; buffering subsequent packets of said burst in a region of at least one of said common buffers; buffering a first packet of a subsequent burst transfer in an empty region having a size of at least one packet in said region of said at least one of said common buffers; and continuing to buffer subsequent packets by securing another region of said at least one of said common buffers in said burst transfer mode, wherein said region of said at least one of said common buffers has a size corresponding to a packet size×a maximum burst length.

8. The data communication method as defined in claim 7, wherein
said common buffers are managed using a table having a field that identifies said common buffers, a field that identifies said reception controllers using said common buffers, and a field that indicates the order in which said common buffers are secured when packets are buffered in said common buffers.

9. The data communication method as defined in claim 7, further comprising:
receiving packets in the burst transfer mode defined in the USB 3.0 standard.

10. A computer program recorded on a nontransitory computer-readable medium, which is executed by a computer constituting a communication control device having: a plurality of reception controllers capable of receiving data in a burst transfer mode in which a plurality of packets are continuously transferred as one burst; a plurality of dedicated buffers having a capacity of at least one packet and corresponding to said reception controllers; and a plurality of common buffers having a capacity of at least the number of packets continuously transferred in said burst transfer mode and shared by a plurality of said reception controllers; said computer program being executed by the computer to cause the computer to perform operations comprising: buffering a first packet of a burst in at least one of said dedicated buffers when said burst transfer mode is started;
buffering subsequent packets of said burst in a region of at least one of said common buffers; a first packet of a subsequent burst transfer in an empty region having a size of at least one packet in said region of said at least one of said common buffers; and continuing to buffer subsequent packets by securing another region of said at least one of said common buffers in said burst transfer mode, wherein said region of said at least one of said common buffers has a size corresponding to a packet size×a maximum burst length.

11. The computer program as defined in claim 10, wherein said program further comprising executing of:
managing said common buffers using a table having a field that identifies said common buffers, a field that identifies said reception controllers using said common buffers, and a field that indicates the order in which said common buffers are secured when packets are buffered in said common buffers.

12. The computer program as defined in claim 10, said program further comprising executing of:
receiving packets in the burst transfer mode defined in the USB 3.0 standard.

13. The communication control device as defined in claim 1, wherein said at least one of said dedicated buffers has a size corresponding to one packet, and not two or more packets.

* * * * *